(12) United States Patent
Lee (10) Patent No.: US 9,256,057 B2
(45) Date of Patent: Feb. 9, 2016

(54) PROJECTION LENS

(71) Applicants: Sintai Optical (Shenzhen) Co., Ltd., Shenzhen, Guandong Province (CN); Asia Optical International Ltd., Tortola (GB)

(72) Inventor: Tsan-Haw Lee, Taichung (TW)

(73) Assignees: SINTAI OPTICAL (SHENZHEN) CO., LTD., Shenzhen, Guandong Province (CN); ASIA OPTICAL INTERNATIONAL LTD., Tortola (VG)

( * ) Notice: Subject to any disclaimer, the term of this patent is extended or adjusted under 35 U.S.C. 154(b) by 89 days.

(21) Appl. No.: 14/076,393

(22) Filed: Nov. 11, 2013

(65) Prior Publication Data

US 2014/0133038 A1 May 15, 2014

Related U.S. Application Data

(60) Provisional application No. 61/725,505, filed on Nov. 13, 2012.

(51) Int. Cl.
*G02B 3/02* (2006.01)
*G02B 13/04* (2006.01)

(52) U.S. Cl.
CPC ...................... *G02B 13/04* (2013.01)

(58) Field of Classification Search
USPC .................................. 359/708, 749
See application file for complete search history.

(56) References Cited

U.S. PATENT DOCUMENTS

2010/0165477 A1* 7/2010 Nagahara .................. 359/682

FOREIGN PATENT DOCUMENTS

TW 200743813 12/2007

OTHER PUBLICATIONS

English Abstract translation of TW200743813 (Published Dec. 1, 2007).

* cited by examiner

*Primary Examiner* — Jack Dinh
(74) *Attorney, Agent, or Firm* — McClure, Qualey & Rodack, LLP (57) ABSTRACT

A projection lens includes a first lens group, a second lens group and a third lens group, all of which are arranged in sequence from an projection side to an image source side along an optical axis. The first lens group is with negative refractive power and includes four lenses. The second lens group is with positive refractive power and includes two lenses. The third lens group is with positive refractive power and includes a stop and six lenses.

18 Claims, 12 Drawing Sheets

DETAILED DESCRIPTION OF THE INVENTION

PROJECTION LENS

BACKGROUND OF THE INVENTION

1. Field of the Invention

The invention relates to a projection lens.

2. Description of the Related Art

In general the back focal length of a projection lens is about 20 mm so that optical components disposed between the projection lenses and image source are limited in thickness or number. Therefore, the design of projector is liable to constraint.

BRIEF SUMMARY OF THE INVENTION

The invention provides a projection lens to solve the above problems. The projection lens is provided with a longer back focal length and a shortened total track length, and still has good optical performance and resolution.

The projection lens in accordance with an exemplary embodiment of the invention includes a first lens group, a second lens group and a third lens group, all of which are arranged in sequence from an projection side to an image source side along an optical axis. The first lens group is with negative refractive power and includes a first lens, a second lens, a third lens and a fourth lens, all of which are arranged in sequence from the projection side to the image source side along the optical axis. The second lens group is with positive refractive power and includes a fifth lens and a sixth lens, both of which are arranged in sequence from the projection side to the image source side along the optical axis. The third lens group is with positive refractive power and includes a stop, a seventh lens, an eighth lens, a ninth lens, a tenth lens, an eleventh lens and a twelfth lens, all of which are arranged in sequence from the projection side to the image source side along the optical axis.

In another exemplary embodiment, the eighth lens and the ninth lens are cemented.

In yet another exemplary embodiment, the tenth lens and the eleventh lens are cemented.

In another exemplary embodiment, the first lens group satisfies the following condition:

$$0.7 < |f_1/f_w| < 1.2$$

wherein $f_1$ is the effective focal length of the first lens group and $f_w$ is the effective focal length of the projection lens.

In yet another exemplary embodiment, the second lens group satisfies the following condition:

$$1.2 < |f_2/f_w| < 1.5$$

wherein $f_2$ is the effective focal length of the second lens group and $f_w$ is the effective focal length of the projection lens.

In another exemplary embodiment, the third lens group satisfies the following condition:

$$1.65 < |f_3/f_w| < 2.0$$

wherein $f_3$ is the effective focal length of the third lens group and $f_w$ is the effective focal length of the projection lens.

In yet another exemplary embodiment, the projection lens satisfies the following condition:

$$2.95 < |tt/bf| < 3.2$$

wherein tt is the total track length of the projection lens and bf is the back focal length of the projection lens.

In another exemplary embodiment, at least one lens of the third lens group is an aspheric lens, the aspheric lens satisfies the following condition:

$$2.2 < |f_A/f_w| < 2.5$$

wherein $f_A$ is the effective focal length of the aspheric lens and $f_w$ is the effective focal length of the projection lens.

In yet another exemplary embodiment, the first lens is a biconvex lens, the second lens is a meniscus lens, the third lens is with negative refractive power and the fourth lens is with negative refractive power.

In another exemplary embodiment, the fifth lens and the sixth lens are meniscus lenses.

In yet another exemplary embodiment, the seventh lens, the eighth lens and the eleventh lens are with positive refractive power and the ninth lens and the tenth lens are with negative refractive power.

A detailed description is given in the following embodiments with reference to the accompanying drawings.

BRIEF DESCRIPTION OF THE DRAWINGS

The invention can be more fully understood by reading the subsequent detailed description and example with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

Figure 1:
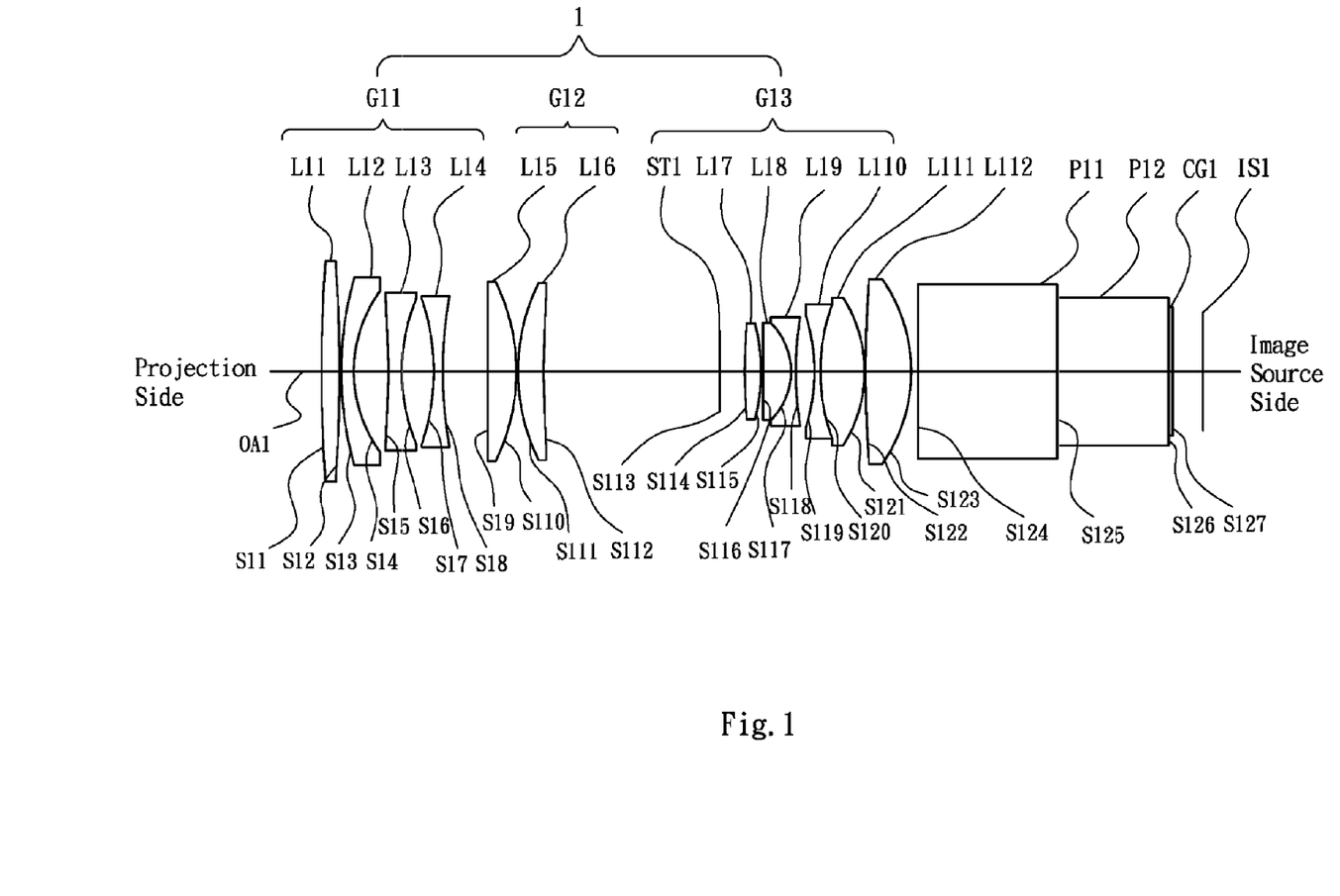
FIG. 1 is a lens layout diagram of a projection lens in accordance with a first embodiment of the invention.

Referring to FIG. 1, FIG. 1 is a lens layout diagram of a projection lens in accordance with a first embodiment of the invention. The projection lens 1 includes a first lens group G11, a second lens group G12 and a third lens group G13, all of which are arranged in sequence from a projection side to an image source side along an optical axis OA1. The first lens group G11 is with negative refractive power and includes a first lens L11, a second lens L12, a third lens L13 and a fourth lens L14, all of which are arranged in sequence from the projection side to the image source side along the optical axis OA1. The first lens L11 is a biconvex lens and made of glass material. The second lens L12 is a convex-concave lens and made of glass material. The surface S13 is a convex surface facing the projection side. The surface S14 is a concave surface facing the image source side. The third lens L13 is a biconcave lens with negative refractive power and made of glass material. The fourth lens L14 is a biconcave lens with negative refractive power and made of glass material. All of the first lens L11, the second lens L12, the third lens L13 and the fourth lens L14 are spherical lenses. The second lens group G12 is with positive refractive power and includes a fifth lens L15 and a sixth lens L16, both of which are arranged in sequence from the projection side to the image source side along the optical axis OA1. The fifth lens L15 is a concave-convex lens and made of glass material. The surface S19 is a concave surface facing the projection side. The surface S110 is a convex surface facing the image source side. The sixth lens L16 is a convex-concave lens and made of glass material. The surface S111 is a convex surface facing the projection side. The surface S112 is a concave surface facing the image source side. Both of the fifth lens L15 and the sixth lens L16 are spherical lenses. The third lens group G13 is with positive refractive power and includes a stop ST1, a seventh lens L17, an eighth lens L18, a ninth lens L19, a tenth lens L110, an eleventh lens L111 and a twelfth lens L112, all of which are arranged in sequence from the projection side to the image source side along the optical axis OA1. The seventh lens L17 is a biconvex lens with positive refractive power and made of glass material. The eighth lens L18 is a biconvex lens with positive refractive power and made of glass material. The ninth lens L19 is biconcave lens with negative refractive power and made of glass material. The tenth lens L110 is a biconcave lens with negative refractive power and made of glass material. The eleventh lens L111 is a biconvex lens with positive refractive power and made of glass material. The twelfth lens L112 is a biconvex lens and made of glass material. The eighth lens L18 and the ninth lens L19 are cemented. The tenth lens L110 and the eleventh lens L111 are cemented. The seventh lens L17 is an aspheric lens. All of the eighth lens L18, the ninth lens L19, the tenth lens L110, the eleventh lens L111 and the twelfth lens L112 are spherical lenses.

A first prism P11 is disposed between the third lens group G13 and the image source IS1. A second prism P12 is disposed between the first prism P11 and the image source IS1. A cover glass CG1 is disposed between the second prism P12 and the image source IS1. All of the surfaces 124, 125, 126, 127 are plane surfaces.

In order to maintain excellent optical performance of the projection lens of the present invention, the projection lens 1 in accordance with the first embodiment of the invention must satisfies the following five conditions:

$$0.7 < |fl_1/fl_w| < 1.2 \quad (1)$$

$$1.2 < |fl_2/fl_w| < 1.5 \quad (2)$$

$$1.65 < |fl_3/fl_w| < 2.0 \quad (3)$$

$$2.95 < |tt1/bfl| < 3.2 \quad (4)$$

$$2.2 < |fl_A/fl_w| < 2.5 \quad (5)$$

wherein $fl_1$ is the effective focal length of the first lens group G11, $fl_2$ is the effective focal length of the second lens group G12, $fl_3$ is the effective focal length of the third lens group G13, $fl_w$ is the effective focal length of the projection lens 1, tt1 is the total track length of the projection lens 1, bfl is the back focal length of the projection lens 1 and $fl_A$ is the effective focal length of the aspheric lens of the third lens group G13.

By the above design of the lenses and stop ST1, the projection lens 1 is provided with a shortened total track length, an increased resolution and an effective corrected aberration.

In order to achieve the above purpose and effectively enhance the optical performance, the projection lens 1 of the first embodiment of the invention is provided with the optical specifications shown in Table 1, which include the effective focal length, F-number, total track length, radius of curvature of each lens surface, thickness between adjacent surface, refractive index of each lens and Abbe number of each lens. Table 1 shows that the effective focal length=16.37 mm, F-number=2.5 and total track length=127 mm for the projection lens 1 of the first embodiment of the invention.

TABLE 1

Effective Focal Length = 16.37 mm
F-number = 2.5
Total Track Length = 127 mm

| Surface Number | Radius of Curvature (mm) | Thickness (mm) | Nd | Vd | Remark |
|---|---|---|---|---|---|
| S11 | 189.5887 | 2.768826 | 1.541 | 47.22 | The First Lens L11 |
| S12 | −189.5823 | 0.1 | | | |
| S13 | 47.71453 | 1.8 | 1.713 | 53.86 | The Second Lens L12 |
| S14 | 19.27645 | 5.088189 | | | |
| S15 | −144.819 | 1.8 | 1.516 | 64.14 | The Third Lens L13 |
| S16 | 25.97957 | 4.772428 | | | |
| S17 | −30.99031 | 1.2 | 1.678 | 55.34 | The Fourth Lens L14 |
| S18 | 59.44151 | 6.658378 | | | |
| S19 | −453.8342 | 4.031445 | 1.743 | 49.37 | The Fifth Lens L15 |
| S110 | −28.59665 | 0.1 | | | |
| S111 | 28.27968 | 3.697535 | 1.723 | 37.96 | The Sixth Lens L16 |
| S112 | 170.7409 | 25.39199 | | | |
| S113 | ∞ | 3.571922 | | | Stop ST1 |
| S114 | 77.42437 | 2.446734 | 1.515 | 63.86 | The Seventh Lens L17 |
| S115 | −25.92515 | 0.1112149 | | | |
| S116 | 169.3135 | 4.156581 | 1.516 | 64.14 | The Eighth Lens L18 |
| S117 | −9.841256 | 0.6 | 1.785 | 26.29 | The Ninth Lens L19 |
| S118 | 42.80969 | 2.762201 | | | |
| S119 | −27.1192 | 0.8 | 1.700 | 30.13 | The Tenth Lens L110 |
| S120 | 27.11901 | 6.498499 | 1.497 | 81.55 | The Eleventh Lens L111 |
| S121 | −19.36485 | 0.1 | | | |
| S122 | 188.5254 | 6.544058 | 1.847 | 23.78 | The Twelfth Lens L112 |
| S123 | −23.23343 | 1 | | | |
| S124 | ∞ | 20 | 1.516 | 64.14 | The First Prism P11 |
| S125 | ∞ | 16 | 1.589 | 61.27 | The Second Prism P12 |
| S126 | ∞ | 0.65 | 1.488 | 70.24 | Cover Glass CG1 |
| S127 | ∞ | 2.35 | | | |

The aspheric surface sag z of each lens in table 1 can be calculated by the following formula:

$$z = ch^2/\{1 + [1 - (k+1)c^2h^2]^{1/2}\} + Ah^4 + Bh^6 + Ch^8 + Dh^{10}$$

where c is curvature, h is the vertical distance from the lens surface to the optical axis, k is conic constant and A, B, C and D are aspheric coefficients.

In the first embodiment, the conic constant k and the aspheric coefficients A, B, C, D of each surface are shown in Table 2.

TABLE 2

| Surface Number | k | A | B | C | D |
| --- | --- | --- | --- | --- | --- |
| S114 | 0 | 2.60E−05 | −1.32E−07 | −2.44E−09 | 2.40E−10 |
| S115 | 4.015223 | 7.11E−05 | 1.31E−07 | −2.09E−08 | 5.66E−10 |

For the projection lens 1 of the first embodiment, the effective focal length $f1_1$ of the first lens group G11 equals to −11.91 mm, the effective focal length $f1_2$ of the second lens group G12 is equal to 21.4 mm, the effective focal length $f1_3$ of the third lens group G13 is equal to 29.243 mm, the effective focal length $f1_w$ of the projection lens 1 is equal to 16.37 mm, the total track length tt1 of the projection lens 1 is equal to 127 mm, the back focal length bf1 of the projection lens 1 is equal to 42 mm, and the effective focal length $f1_A$ of the aspheric lens of the third lens group G13 is equal to 37.8008 mm. According to the above data, the following values can be obtained:

$$|f1_1/f1_w|=0.73,$$

$$|f1_2/f1_w|=1.31,$$

$$|f1_3/f1_w|=1.79,$$

$$|tt1/bf1|=3.02,$$

$$|f1_A/f1_w|=2.3,$$

which respectively satisfy the above conditions (1)-(5).

Figure 2A:
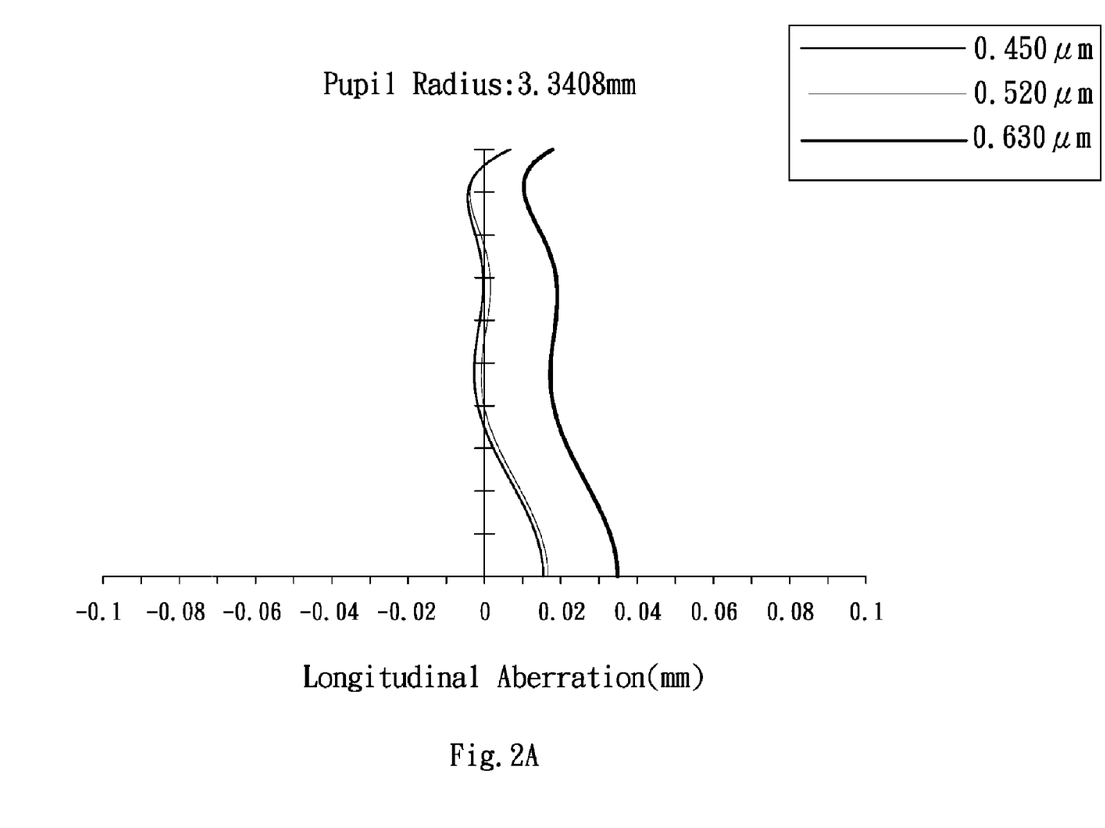
FIG. 2A is a longitudinal aberration diagram of a projection lens in accordance with a first embodiment of the invention.
Figure 2B:
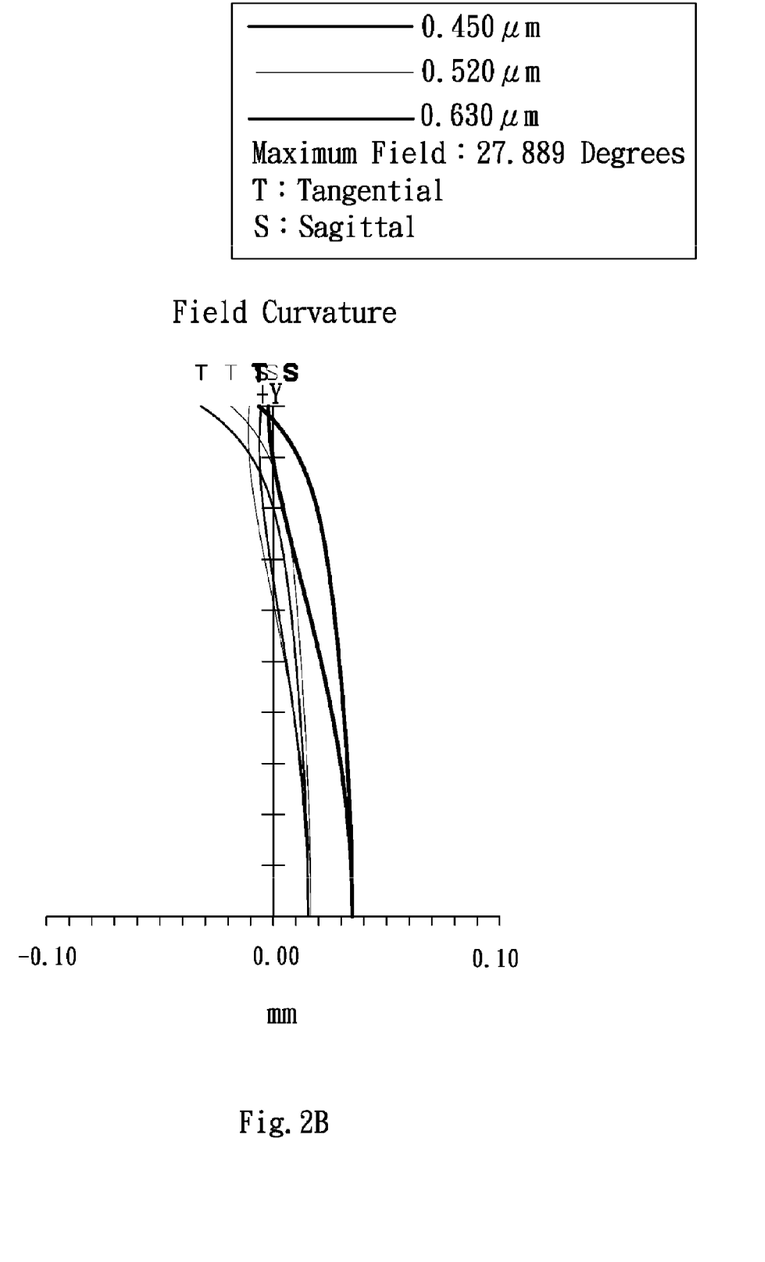
FIG. 2B is a field curvature diagram of a projection lens in accordance with a first embodiment of the invention.
Figure 2C:
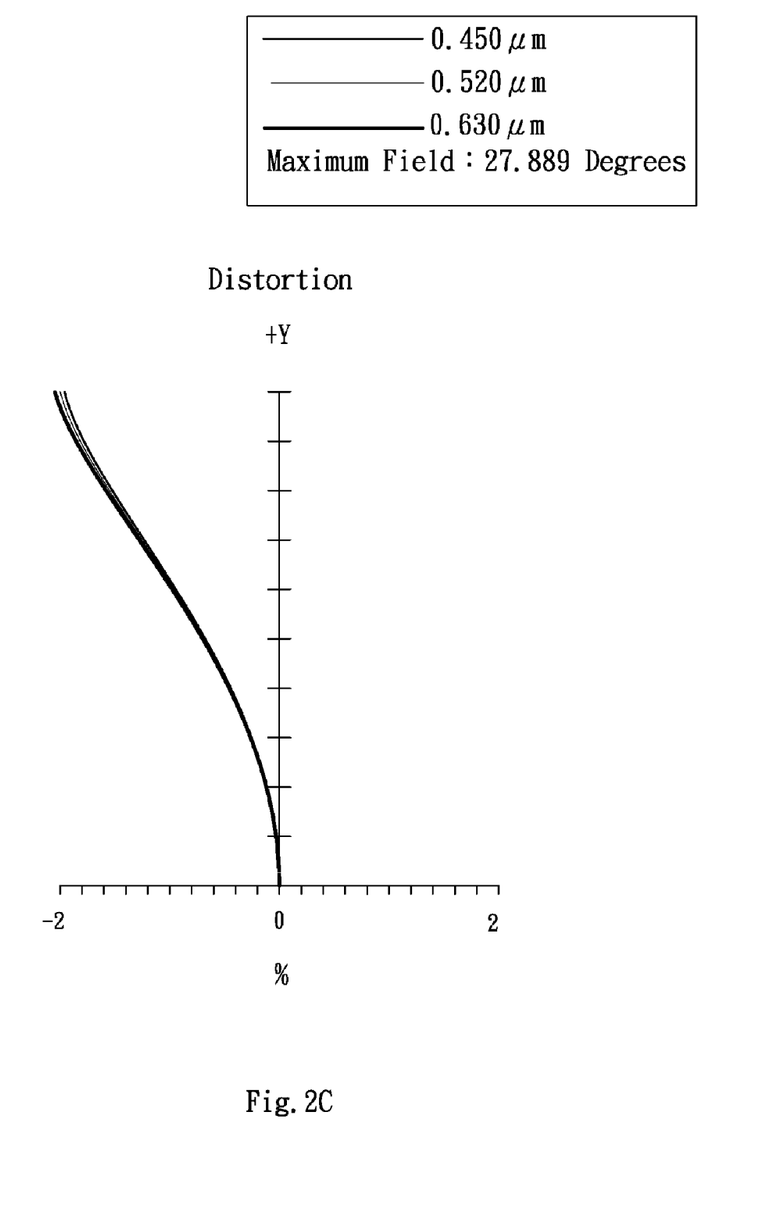
FIG. 2C is a distortion diagram of a projection lens in accordance with a first embodiment of the invention.
Figure 2D:
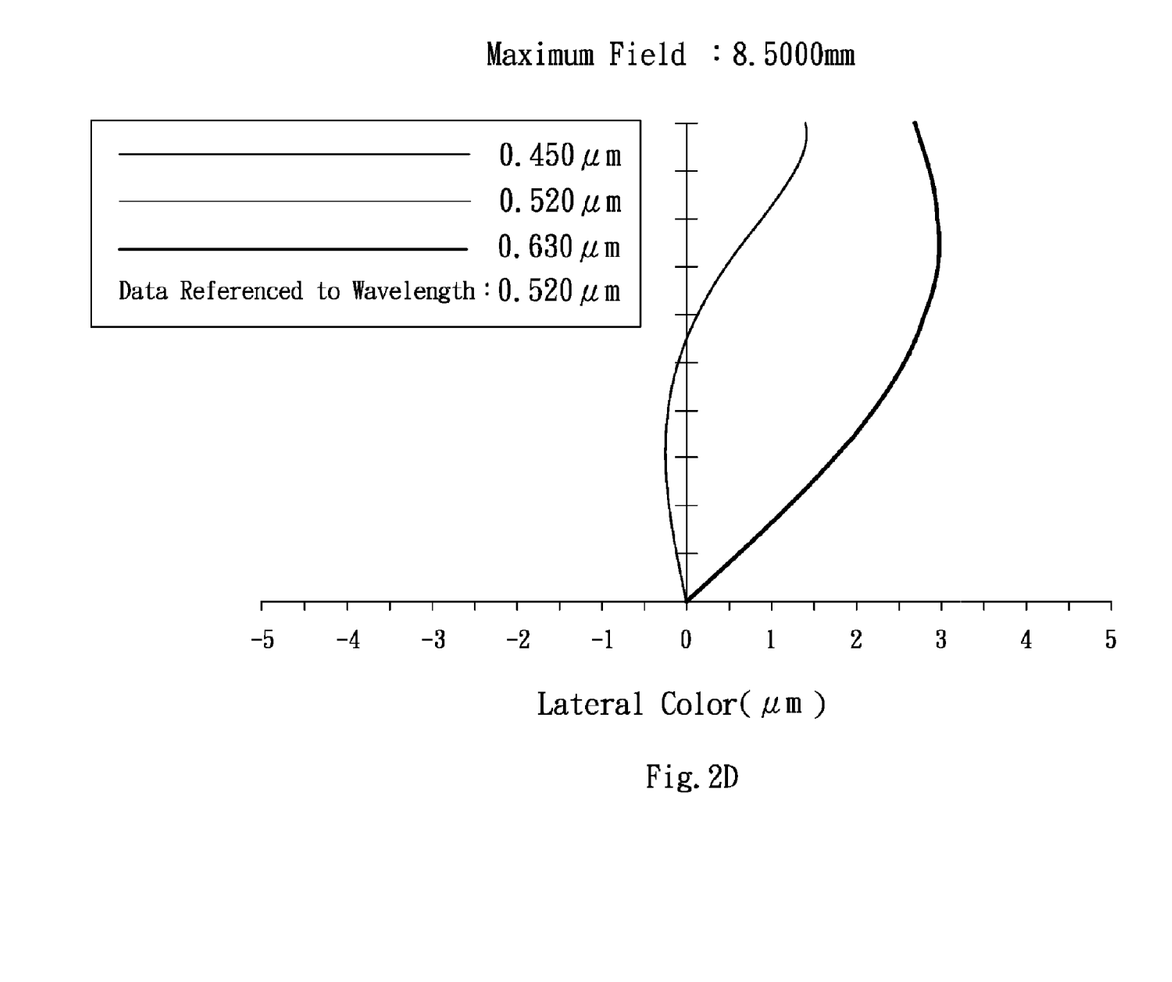
FIG. 2D is a lateral color diagram of a projection lens in accordance with a first embodiment of the invention.
Figure 2E:
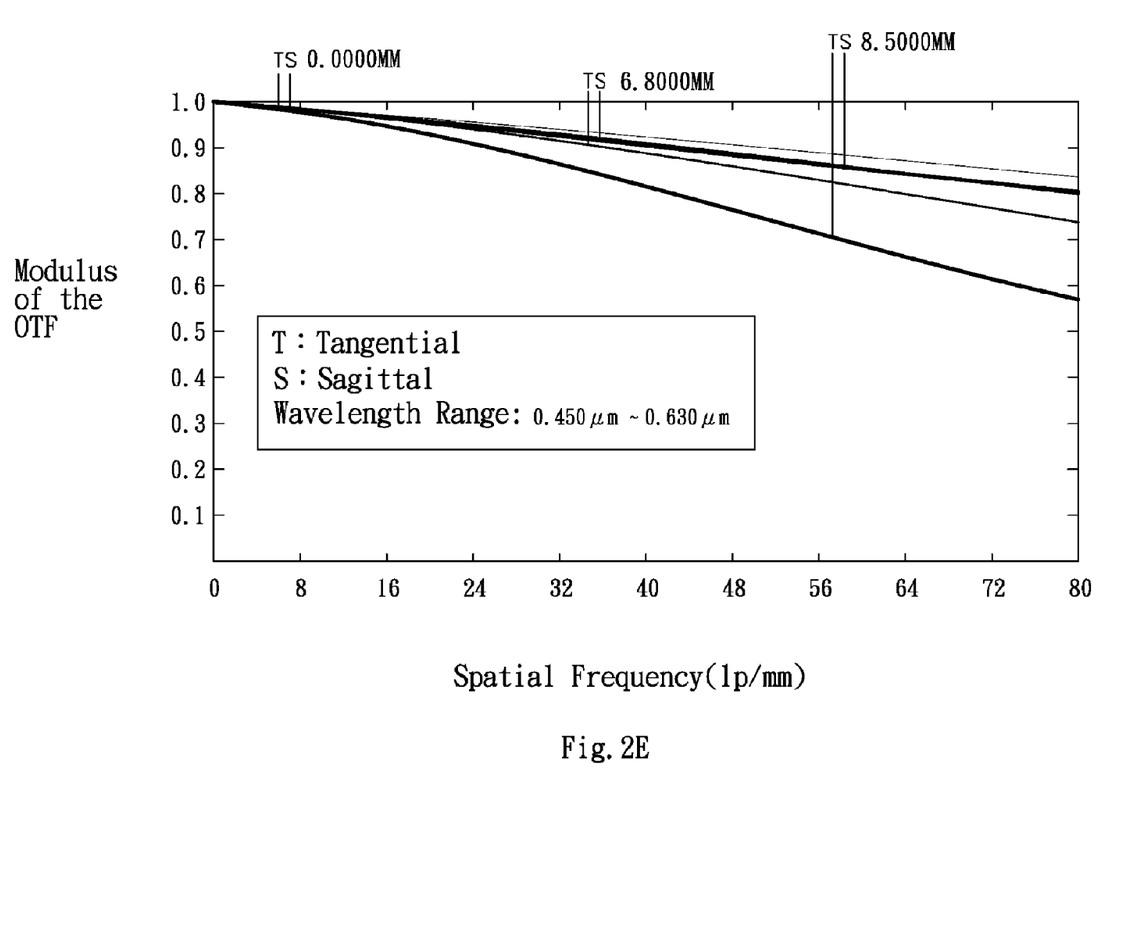
FIG. 2E is a modulation transfer function diagram of a projection lens in accordance with a first embodiment of the invention.

By the above arrangements of the lenses and stop ST1, the projection lens 1 of the first embodiment can meet the requirements of optical performance as seen in FIGS. 2A-2E, wherein FIG. 2A shows the longitudinal aberration diagram of the projection lens 1 of the first embodiment, FIG. 2B shows the field curvature diagram of the projection lens 1 of the first embodiment, FIG. 2C shows the distortion diagram of the projection lens 1 of the first embodiment, FIG. 2D shows the lateral color diagram of the projection lens 1 of the first embodiment, and FIG. 2E shows the modulation transfer function diagram of the projection lens 1 of the first embodiment.

It can be seen from FIG. 2A that the longitudinal aberration in the first embodiment ranges between −0.01 mm and 0.04 mm for the wavelength of 0.450 μm, 0.520 μm, and 0.630 μm. It can be seen from FIG. 2B that the field curvature of tangential direction and sagittal direction in the first embodiment ranges between −0.035 mm and 0.04 mm for the wavelength of 0.450 μm, 0.520 μm, and 0.630 μm. It can be seen from FIG. 2C that the distortion in the first embodiment ranges between −2.2% and 0.0% for the wavelength of 0.450 μm, 0.520 μm, and 0.630 μm. It can be seen from FIG. 2D that the lateral color of different fields in the first embodiment ranges between −0.25 μm and 3.0 μm for the wavelength of 0.450 μm, 0.520 μm, and 0.630 μm. It can be seen from FIG. 2E that the modulation transfer function of tangential direction and sagittal direction in the first embodiment ranges between 0.56 and 1.0 for the wavelength ranges between 0.450 μm and 0.630 μm, each field is 0.0000 mm, 6.8000 mm, and 8.5000 mm, spatial frequency ranges between 0 lp/mm and 80 lp/mm. It is obvious that the longitudinal aberration, the field curvature, the distortion and the lateral color of the projection lens 1 of the first embodiment can be corrected effectively, and the image resolution can meet the requirement, thereby capable of obtaining good optical performance.

Figure 3:
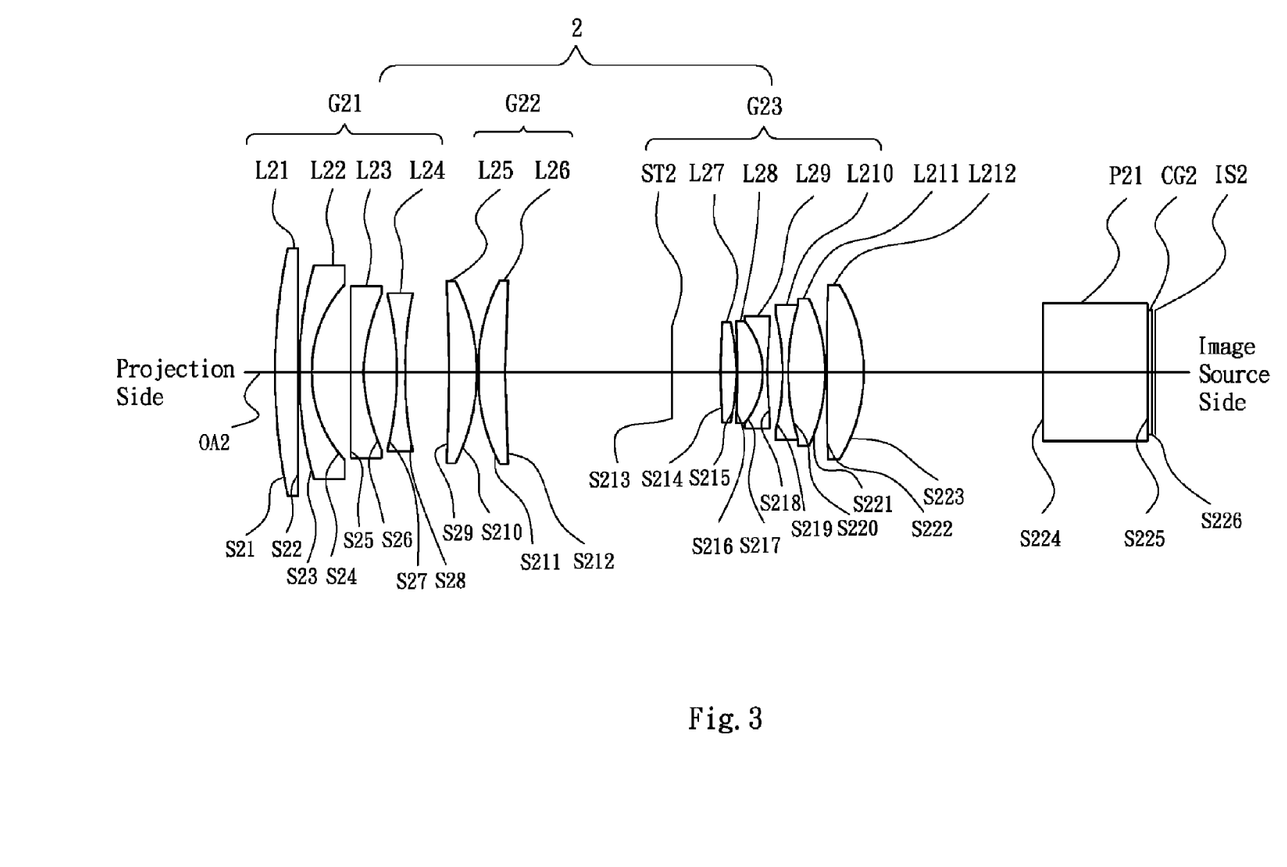
FIG. 3 is a lens layout diagram of a projection lens in accordance with a second embodiment of the invention.

Referring to FIG. 3, FIG. 3 is a lens layout diagram of a projection lens in accordance with a second embodiment of the invention. The projection lens 2 includes a first lens group G21, a second lens group G22 and a third lens group G23, all of which are arranged in sequence from a projection side to an image source side along an optical axis OA2. The first lens group G21 is with negative refractive power and includes a first lens L21, a second lens L22, a third lens L23 and a fourth lens L24, all of which are arranged in sequence from the projection side to the image source side along the optical axis OA2. The first lens L21 is a plane-convex lens and made of glass material. The surface S21 is a convex surface facing the projection side. The surface S22 is a plane surface facing the image source side. The second lens L22 is a convex-concave lens and made of glass material. The surface S23 is a convex surface facing the projection side. The surface S24 is a concave surface facing the image source side. The third lens L23 is a plane-concave lens with negative refractive power and made of glass material. The surface S25 is a plane surface facing the projection side. The surface S26 is a concave surface facing the image source side. The fourth lens L24 is a biconcave lens with negative refractive power and made of glass material. All of the first lens L21, the second lens L22, the third lens L23 and the fourth lens L24 are spherical lenses. The second lens group G22 is with positive refractive power and includes a fifth lens L25 and a sixth lens L26, both of which are arranged in sequence from the projection side to the image source side along the optical axis OA2. The fifth lens L25 is a concave-convex lens and made of glass material. The surface S29 is a concave surface facing the projection side. The surface S210 is a convex surface facing the image source side. The sixth lens L26 is a convex-concave lens and made of glass material. The surface S211 is a convex surface facing the projection side. The surface S212 is a concave surface facing the image source side. Both of the fifth lens L25 and the sixth lens L26 are spherical lenses. The third lens group G23 is with positive refractive power and includes a stop ST2, a seventh lens L27, an eighth lens L28, a ninth lens L29, a tenth lens L210, an eleventh lens L211 and a twelfth lens L212, all of which are arranged in sequence from the projection side to the image source side along the optical axis OA2. The seventh lens L27 is a biconvex lens with positive refractive power and made of glass material. The eighth lens L28 is a concave-convex lens with positive refractive power and made of glass material. The surface S216 is a concave surface facing the projection side. The surface S217 is a convex surface facing the image source side. The ninth lens L29 is biconcave lens with negative refractive power and made of glass material. The tenth lens L210 is a biconcave lens with negative refractive power and made of glass material. The eleventh lens L211 is a biconvex lens with positive refractive power and made of glass material. The twelfth lens L212 is a biconvex lens and made of glass material. The eighth lens L28 and the ninth lens L29 are cemented. The tenth lens L210 and the eleventh lens L211 are cemented. The seventh lens L27 is an aspheric lens. All of the eighth lens L28, the ninth lens L29, the tenth lens L210, the eleventh lens L211 and the twelfth lens L212 are spherical lenses.

A first prism P21 is disposed between the third lens group G23 and the image source IS2. A cover glass CG2 is disposed between the first prism P21 and the image source IS2. All of the surfaces 224, 225, 226 are plane surfaces.

In order to maintain excellent optical performance of the projection lens of the present invention, the projection lens 2 in accordance with the second embodiment of the invention must satisfies the following five conditions:

$$0.7<|f2_1/f2_w|<1.2 \quad (6)$$

$$1.2<|f2_2/f2_w|<1.5 \quad (7)$$

$1.65<|f2_3/f2_w|<2.0$ (8)

$2.95<|tt2/bf2|<3.2$ (9)

$2.2<|f2_A/f2_w|<2.5$ (10)

wherein $f2_1$ is the effective focal length of the first lens group G21, $f2_2$ is the effective focal length of the second lens group G22, $f2_3$ is the effective focal length of the third lens group G23, $f2_w$ is the effective focal length of the projection lens 2, tt2 is the total track length of the projection lens 2, bf2 is the back focal length of the projection lens 2 and $f2_A$ is the effective focal length of the aspheric lens of the third lens group G23.

By the above design of the lenses and stop ST2, the projection lens 2 is provided with a shortened total track length, a increased resolution and a effective corrected aberration.

In order to achieve the above purpose and effectively enhance the optical performance, the projection lens 2 of the second embodiment of the invention is provided with the optical specifications shown in Table 3, which include the effective focal length, F-number, total track length, radius of curvature of each lens surface, thickness between adjacent surface, refractive index of each lens and Abbe number of each lens. Table 3 shows that the effective focal length=16.37 mm, F-number=2.5 and total track length=127 mm for the projection lens 2 of the second embodiment of the invention.

TABLE 3

Effective Focal Length = 16.37 mm
F-number = 2.5
Total Track Length = 127 mm

| Surface Number | Radius of Curvature (mm) | Thickness (mm) | Nd | Vd | Remark |
|---|---|---|---|---|---|
| S21 | 77.88278 | 3.39 | 1.626 | 35.70 | The First Lens L21 |
| S22 | ∞ | 0.1 | | | |
| S23 | 50.40875 | 1.8 | 1.589 | 61.14 | The Second Lens L22 |
| S24 | 17.52816 | 5.7 | | | |
| S25 | ∞ | 1.8 | 1.488 | 70.24 | The Third Lens L23 |
| S26 | 23.09288 | 4.87 | | | |
| S27 | −41.2732 | 1.2 | 1.806 | 40.93 | The Fourth Lens L24 |
| S28 | 55.10397 | 6.33 | | | |
| S29 | −213.807 | 4.03 | 1.581 | 40.75 | The Fifth Lens L25 |
| S210 | −26.4586 | 0.1 | | | |
| S211 | 26.92007 | 3.91 | 1.648 | 33.79 | The Sixth Lens L26 |
| S212 | 175.6295 | 24.08 | | | |
| S213 | ∞ | 6.99 | | | Stop ST2 |
| S214 | 80 | 2.33 | 1.515 | 63.86 | The Seventh Lens L27 |
| S215 | −27.3385 | 0.1 | | | |
| S216 | −138.107 | 3.7 | 1.497 | 81.55 | The Eighth Lens L28 |
| S217 | −10.6385 | 0.6 | 1.785 | 25.68 | The Ninth Lens L29 |
| S218 | 73.32054 | 2.27 | | | |
| S219 | −31.28 | 0.8 | 1.700 | 30.13 | The Tenth Lens L210 |
| S220 | 31.28 | 5.38 | 1.497 | 81.55 | The Eleventh Lens L211 |
| S221 | −22.5295 | 0.1 | | | |
| S222 | 300 | 5.42 | 1.847 | 23.78 | The Twelfth Lens L212 |
| S223 | −21.9708 | 24.85 | | | |
| S224 | ∞ | 15 | 1.516 | 64.14 | The First Prism P21 |
| S225 | ∞ | 0.65 | 1.488 | 70.24 | Cover Glass CG2 |
| S226 | ∞ | 0.5 | | | |

The aspheric surface sag z of each lens in table 3 can be calculated by the following formula:

$$z=ch^2/\{1+[1-(k+1)c^2h^2]^{1/2}\}+Ah^4+Bh^6+Ch^8+Dh^{10}$$

where c is curvature, h is the vertical distance from the lens surface to the optical axis, k is conic constant and A, B, C and D are aspheric coefficients.

In the second embodiment, the conic constant k and the aspheric coefficients A, B, C, D of each surface are shown in Table 4.

TABLE 4

| Surface Number | k | A | B | C | D |
|---|---|---|---|---|---|
| S214 | 0 | −1.95E−06 | −1.88E−07 | −6.49E−09 | 2.97E−10 |
| S215 | 4.423444 | 4.90E−05 | 4.49E−08 | −1.42E−08 | 3.97E−10 |

For the projection lens 2 of the second embodiment, the effective focal length $f2_1$ of the first lens group G21 is equal to 19.235 mm, the effective focal length $f2_2$ of the second lens group G22 is equal to 23.153 mm, the effective focal length $f2_3$ of the third lens group G23 is equal to 31.393 mm, the effective focal length $f2_w$ of the projection lens 2 is equal to 16.37 mm, the total track length tt2 of the projection lens 2 is equal to 127 mm, the back focal length bf2 of the projection lens 2 is equal to 42 mm, and the effective focal length $f2_A$ of the aspheric lens of the third lens group G23 is equal to 39.63 mm According to the above data, the following values can be obtained:

$|f2_1/f2_w|=1.18$, $|f2_2/f2_w|=1.41$, $|f2_3/f2_w|=1.92$, $|tt2/bf2|=3.02$, $|f2_A/f2_w|=2.4$, which respectively satisfy the above conditions (6)-(10).

Figure 4A:
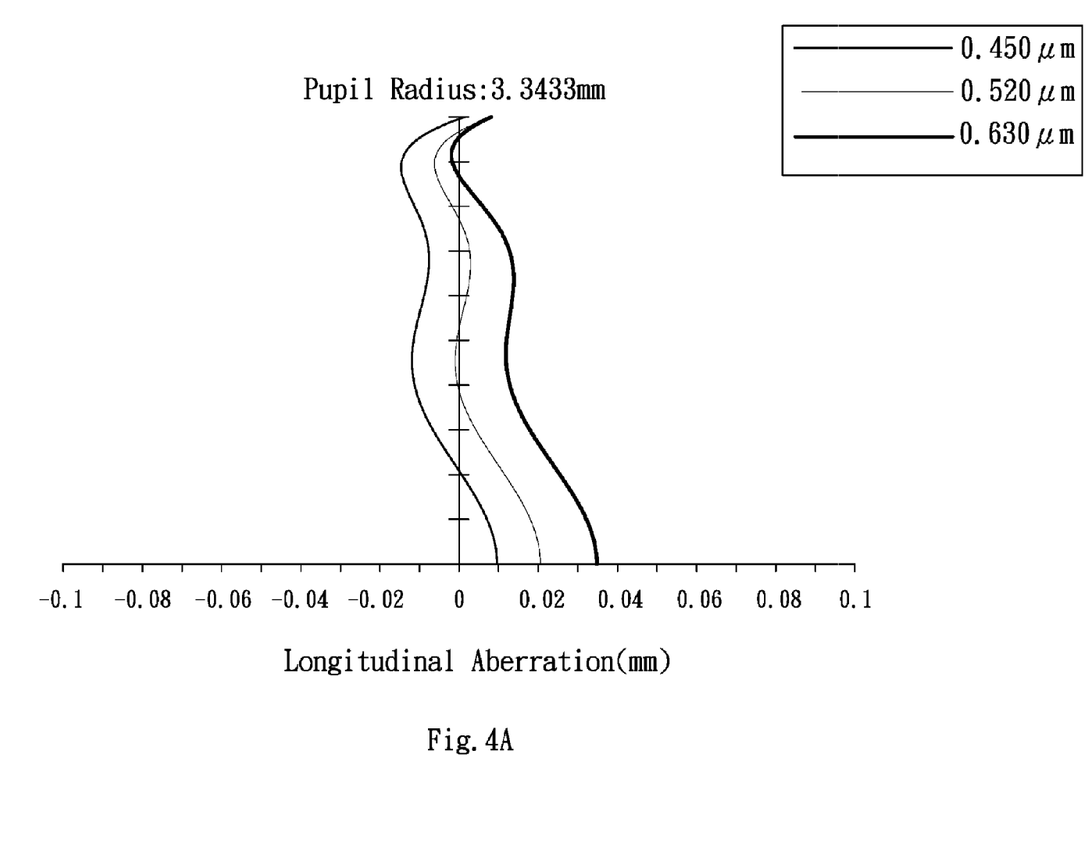
FIG. 4A is a longitudinal aberration diagram of a projection lens in accordance with a second embodiment of the invention.
Figure 4B:
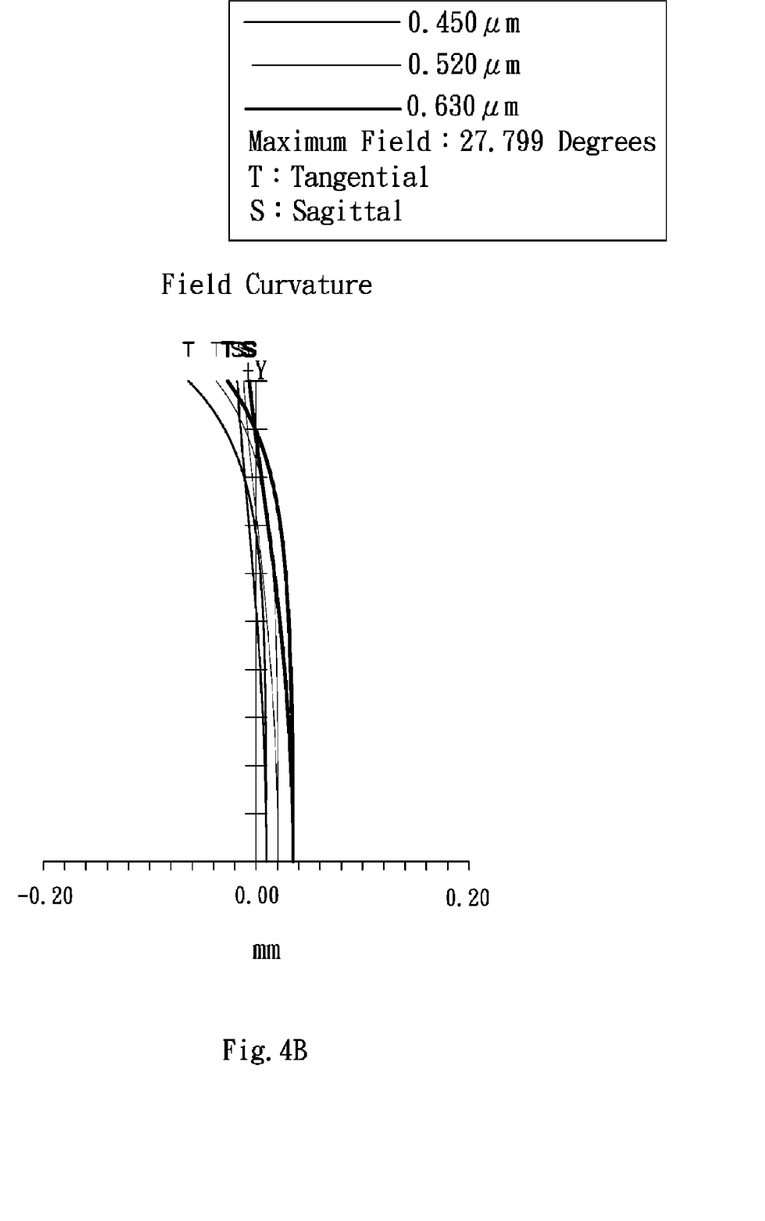
FIG. 4B is a field curvature diagram of a projection lens in accordance with a second embodiment of the invention.
Figure 4C:
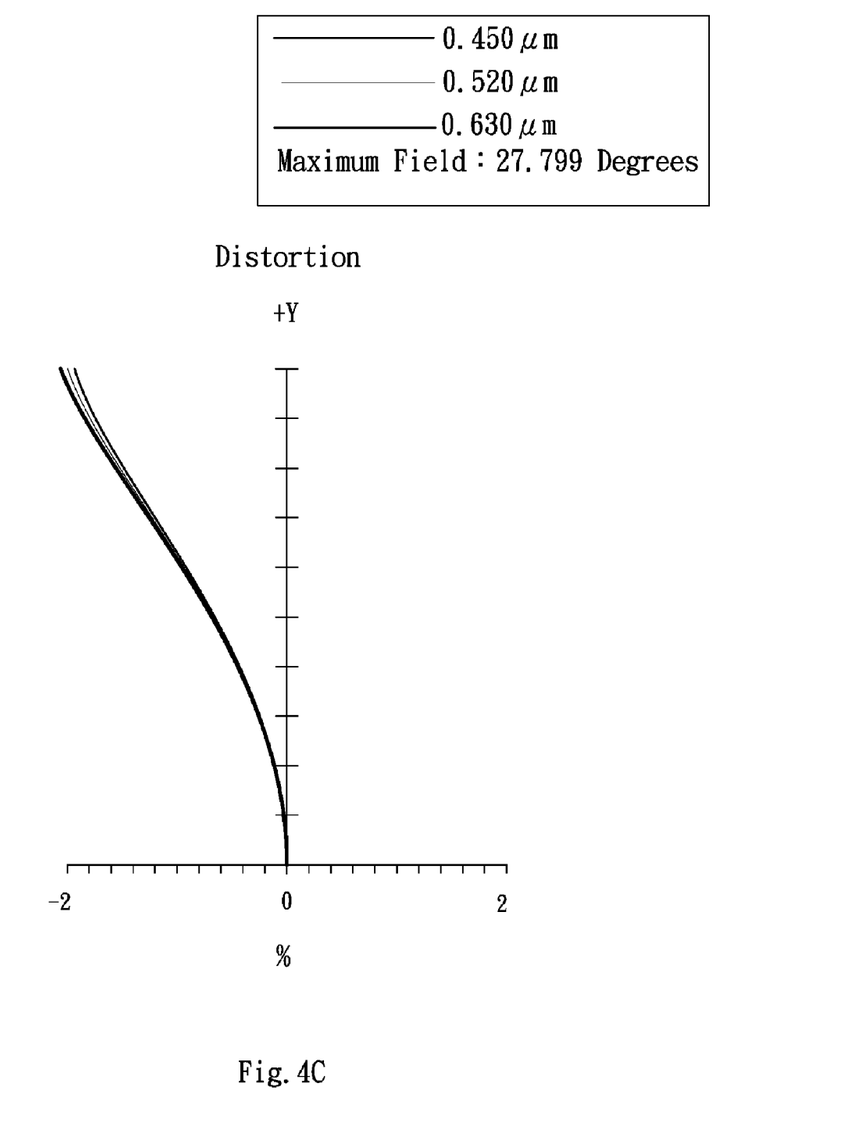
FIG. 4C is a distortion diagram of a projection lens in accordance with a second embodiment of the invention.
Figure 4D:
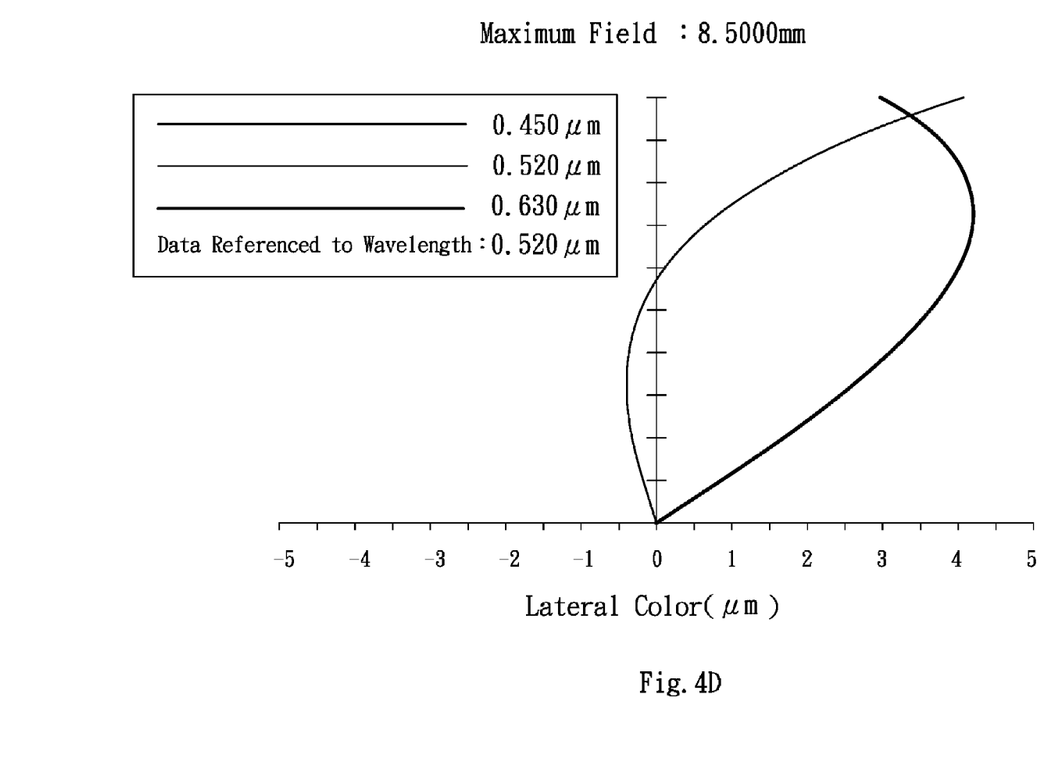
FIG. 4D is a lateral color diagram of a projection lens in accordance with a second embodiment of the invention.
Figure 4E:
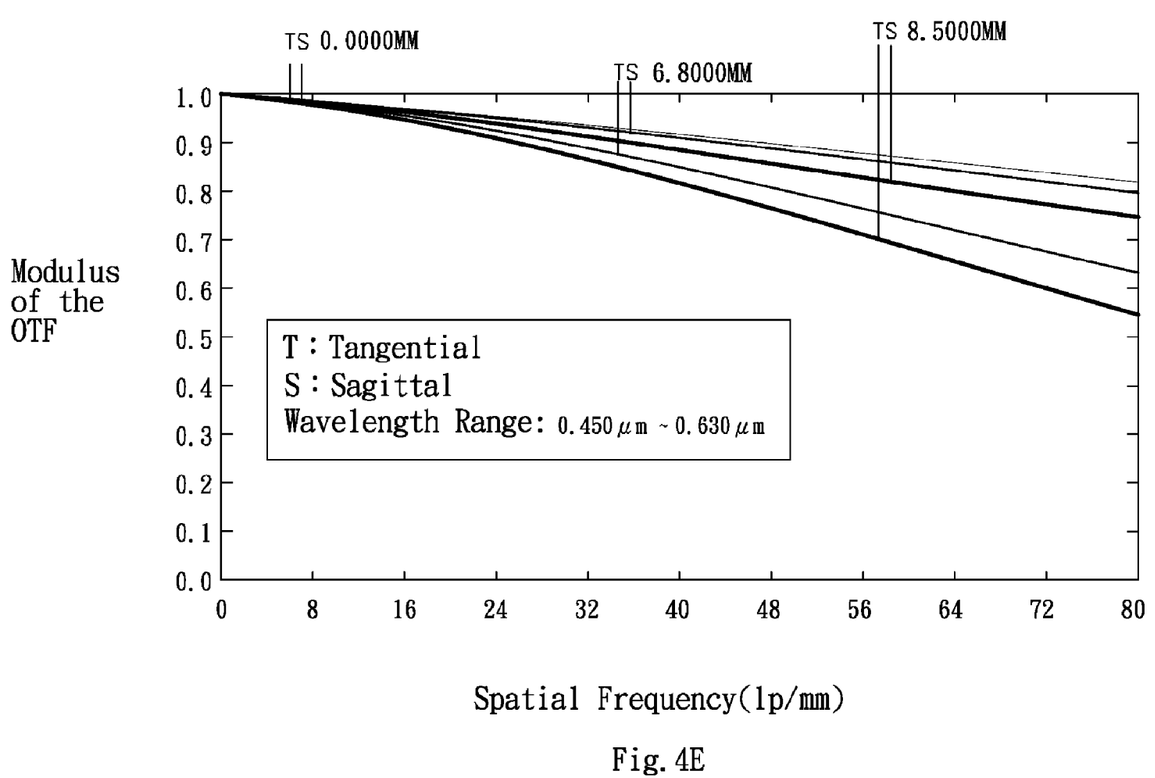
FIG. 4E is a modulation transfer function diagram of a projection lens in accordance with a second embodiment of the invention.

By the above arrangements of the lenses and stop ST2, the projection lens 2 of the second embodiment can meet the requirements of optical performance as seen in FIGS. 4A-4E, wherein FIG. 4A shows the longitudinal aberration diagram of the projection lens 2 of the second embodiment, FIG. 4B shows the field curvature diagram of the projection lens 2 of the second embodiment, FIG. 4C shows the distortion diagram of the projection lens 2 of the second embodiment, FIG. 4D shows the lateral color diagram of the projection lens 2 of the second embodiment, and FIG. 4E shows the modulation transfer function diagram of the projection lens 2 of the second embodiment.

It can be seen from FIG. 4A that the longitudinal aberration in the second embodiment ranges between −0.02 mm and 0.04 mm for the wavelength of 0.450 μm, 0.520 μm, and 0.630 μm. It can be seen from FIG. 4B that the field curvature of tangential direction and sagittal direction in the second embodiment ranges between −0.08 mm and 0.04 mm for the wavelength of 0.450 μm, 0.520 μm, and 0.630 μm. It can be seen from FIG. 4C that the distortion in the second embodiment ranges between −2.1% and 0.0% for the wavelength of 0.450 μm, 0.520 μm, and 0.630 μm. It can be seen from FIG. 4D that the lateral color of different fields in the second embodiment ranges between −0.5 μm and 4.5 μm for the wavelength of 0.450 μm, 0.520 μm, and 0.630 μm. It can be seen from FIG. 4E that the modulation transfer function of tangential direction and sagittal direction in the second embodiment ranges between 0.54 and 1.0 for the wavelength ranges between 0.450 μm and 0.630 μm, each field is 0.0000 mm, 6.8000 mm, and 8.5000 mm, spatial frequency ranges between 0 lp/mm and 80 lp/mm. It is obvious that the longitudinal aberration, the field curvature, the distortion and the lateral color of the projection lens 2 of the second embodiment can be corrected effectively, and the image resolution can meet the requirement, thereby capable of obtaining good optical performance.

In the above embodiments, the seventh lens of the third lens group is an aspheric lens, while the eighth lens, the ninth lens, the tenth lens, the eleventh lens and the twelfth lens are spherical lenses. However, it has the same effect and falls into the scope of the invention that the seventh lens of the third lens group is changed into a spherical lens, and any of the eighth lens, the ninth lens, the tenth lens, the eleventh lens and the twelfth lens is changed into an aspheric lens.

While the invention has been described by way of examples and in terms of embodiments, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A projection lens comprising a first lens group, a second lens group and a third lens group, all of which are arranged in sequence from a projection side to an image source side along an optical axis, wherein:
   the first lens group is with negative refractive power and comprises a first lens, a second lens, a third lens and a fourth lens, all of which are arranged in sequence from the projection side to the image source side along the optical axis;
   the second lens group is with positive refractive power and comprises a fifth lens and a sixth lens, both of which are arranged in sequence from the projection side to the image source side along the optical axis; and
   the third lens group is with positive refractive power and comprises a stop, a seventh lens, an eighth lens, a ninth lens, a tenth lens, an eleventh lens and a twelfth lens, all of which are arranged in sequence from the projection side to the image source side along the optical axis.

2. The projection lens as claimed in claim 1, wherein the eighth lens and the ninth lens are cemented.

3. The projection lens as claimed in claim 1, wherein the tenth lens and the eleventh lens are cemented.

4. The projection lens as claimed in claim 1, wherein the first lens group satisfies:

$0.7<|f_1/f_w|<1.2$ wherein $f_1$ is an effective focal length of the first lens group, and $f_w$ is an effective focal length of the projection lens.

5. The projection lens as claimed in claim 1, wherein the second lens group satisfies:

$1.2<|f_2/f_w|<1.5$ wherein $f_2$ is an effective focal length of the second lens group, and $f_w$ is an effective focal length of the projection lens.

6. The projection lens as claimed in claim 1, wherein the third lens group satisfies:

$1.65<|f_3/f_w|<2.0$ wherein $f_3$ is an effective focal length of the third lens group, and $f_w$ is an effective focal length of the projection lens.

7. The projection lens as claimed in claim 1, wherein the projection lens satisfies:

$2.95<|tt/bf|<3.2$ wherein tt is a total track length of the projection lens, and bf is a back focal length of the projection lens.

8. The projection lens as claimed in claim 1, wherein at least one lens of the third lens group is an aspheric lens, the aspheric lens satisfies:

$2.2<|f_A/f_w|<2.5$ wherein $f_A$ is an effective focal length of the aspheric lens, and $f_w$ is an effective focal length of the projection lens.

9. The projection lens as claimed in claim 1, wherein the first lens is a biconvex lens.

10. The projection lens as claimed in claim 1, wherein the fifth lens and the sixth lens are meniscus lenses.

11. The projection lens as claimed in claim 1, wherein the seventh lens.

12. The projection lens as claimed in claim 1, wherein the second lens is a meniscus lens.

13. The projection lens as claimed in claim 1, wherein the third lens is with negative refractive power.

14. The projection lens as claimed in claim 1, wherein the fourth lens is with negative refractive power.

15. The projection lens as claimed in claim 1, wherein the eighth lens is with positive refractive power.

16. The projection lens as claimed in claim 1, wherein the eleventh lens is with positive refractive power.

17. The projection lens as claimed in claim 1, wherein the ninth lens is with negative refractive power.

18. The projection lens as claimed in claim 1, wherein the tenth lens is with negative refractive power.

* * * * *